Aug. 21, 1928.
L. S. WASHBURN
1,681,890
DIFFUSION PLATE
Filed Jan. 25, 1924
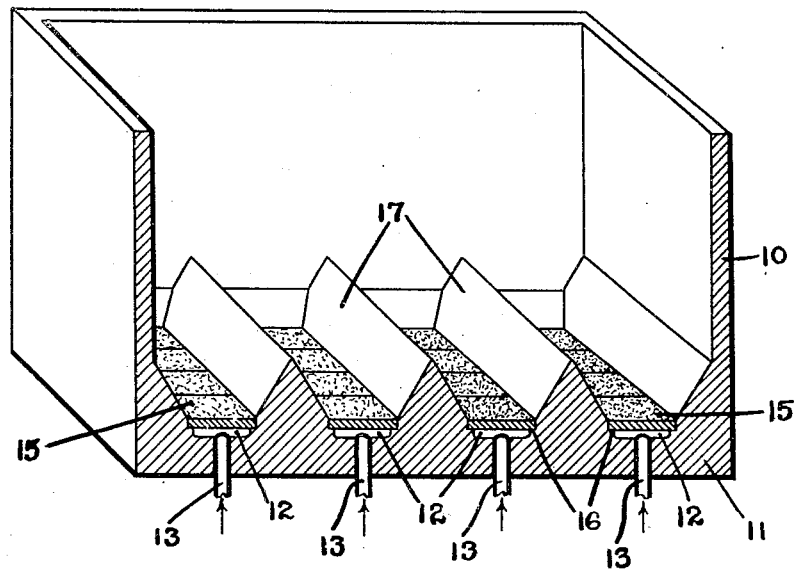
Witnesses
Harold W. Eaton
Leah A. Sessions
Inventor
Lorenzo S. Washburn
By
Clayton L. Jenks
Attorney Patented Aug. 21, 1928.

1,681,890

UNITED STATES PATENT OFFICE.

LORENZO S. WASHBURN, OF WORCESTER, MASSACHUSETTS, ASSIGNOR TO NORTON COMPANY, OF WORCESTER, MASSACHUSETTS, A CORPORATION OF MASSACHUSETTS.

DIFFUSION PLATE.

Application filed January 25, 1924. Serial No. 688,560.

My invention relates to diffusion plates and more particularly to devices which are adapted for aerating sewage or for diffusing gases through liquids, in general.

In accordance with one method of treating sewage, it is found that aerobic bacteria are particularly influential in purifying the sewage. The method as commonly practiced primarily comprises the forced aeration of the sewage in the presence of a considerable amount of accumulated sludge which has been previously enlivened with bacteria and returned to the unactivated material. The easily separable and heavier materials present in the sewage are first screened out or permitted to settle in a sedimentation tank from which they are removed by suitable means. The remaining impure fluid is decanted to the aeration chamber. Activated sludge which has been previously aerated and concentrated is added to this chamber and air is passed upwardly through the liquid for a considerable time until sufficient bacterial growth has taken place. The liquid is continuously withdrawn and the sludge concentrated for drying and final removal or for returning to the aeration chamber. One plant in operation employs for a weak sewage about two cubic feet of air per gallon of sewage and the treatment requires about four hours of time, while the amount of sludge returned to the tank may comprise 20% of the sewage flow.

One common type of apparatus employed for the aeration chamber comprises porous plates arranged in the bottom of a tank. The sewage flows into the compartment above the plates and air is introduced beneath and caused to pass upwardly through the plates and bubble up through the sewage. Various difficulties have been experienced heretofore with plates which have been available on the market and it is accordingly an object of my invention to provide an improved plate construction which will be highly efficient and serviceable for the purpose of aerating and activating sewage sludge or for otherwise diffusing gases through a body of fluid of any character and composition.

It is a further object of my invention to provide a way of protecting a diffusion plate so that gases may be employed therewith which would normally attack the plate.

With these and other objects in view as will be apparent to one skilled in the art, my invention resides in the construction herein described and set forth in the appended claim.

Referring to the drawing, I have there illustrated in a fragmentary perspective view a sewage aeration chamber equipped with porous plates for the passage of air through the fluid.

In the course of my experimentation, I have found that due to the soaking up of water by the diffusion plate, considerable air pressure is required to force the water out of the pores of the plate. The pressure of air required to aerate the liquid being treated equals the head of the water plus the loss of air pressure caused by the air being required to overcome the capillarity of the plate and force the water out of the pores. I propose to minimize the capillary action of the plate and therefore make it feasible to use less air pressure to obtain the desired results.

In accordance with my discovery, I have found that if the walls of the pores of the diffusion plate are coated with a material which is repellant to water, this pressure loss is materially reduced. To this end, I may employ any suitable substance which will coat the pores of the plate and yet is not wetted by water. Of the various available materials, I may use paraffin for the water repellant substance which is solid at the temperature and under the conditions of usage.

If the water cannot wet the surface of the pores, it is not drawn into the pores by capillary action and consequently the plate has free passages for the air to go through, and although the pores are slightly smaller due to the presence of this coating, air will pass more rapidly through the plate than before it was coated.

Since the thickness of the plate has a direct relation to the air pressure required, I propose to employ as thin a plate as is feasible, and I utilize a composition which forms a particularly tough, durable and strong plate. The pore structure should be such as to permit air to pass readily through the plate and yet prevent the easy passage of liquid, except by capillary action. To these ends, I employ granular material of a desired size bonded into a porous structure by clay and the like fused or vitrified in the presence of the grains, the bond adhering locally to the grains and forming connecting posts and webs therebetween and intergranular spaces of various sizes which intercommunicate to form fine passages through the plate. Owing to the high temperature required for vitrifying clay, I employ a refractory material such as crystalline alumina or silicon carbide, which will not be fused or materially softened at the temperature of firing.

As a specific example of a composition suitable for my purposes, I may use grains of crystalline alumina which will just pass through a screen of 60 meshes to the linear inch and bond them by a ceramic bond made up of suitable materials, such as ball clay, slip clay and feldspar proportioned and treated as is well known in the ceramic art. These are mixed with water to form a moldable mass which is shaped as desired. This shape is subjected to a heat treatment corresponding with Seger cone 12 to vitrify the bond and unite the grains into an integral porous mass.

This plate, after it has been fired and cooled, is then treated by a suitable method with the water-repelling substance to coat the walls of the pores adjacent that surface of the plate which is to contact with the liquid. For example, one may employ paraffin and impregnate the open pores adjacent the surface of the plate by melting the paraffin and dipping the plate therein, after which the excess paraffin may be allowed to drain from the plate or be thrown from it by centrifugal action.

One simple construction in which a diffusion plate of this type may be used is shown in the accompanying drawing, in which the figure is a perspective view partly broken away of an aerating tank for activating sludge. As there shown the tank comprises walls 10 and a bottom 11.

The bottom is so formed as to provide air chambers 12 fed by pipes 13 from a source of air maintained under pressure. Diffusion plates 15, made as above described, are supported on shelves 16 so as to form the tops of the air chambers and prevent liquid maintained in the tank from escaping. Triangularly shaped ridges 17 between the rows of plates serve to prevent sludge piling up without being subjected to the action of the air. These plates may be cemented in place or otherwise suitably fastened.

When air is forced into pipes 13, it will bubble upwardly through the sewage placed in the tank. Owing to the presence of the oily material in the pores, water will not be drawn by capillarity into the pores of the plate hence it will not be necessary for the air pressure to overcome such tendency and drive the water from the pores.

By employing ceramic bonded granular material I may obtain any desired porosity, this being accomplished by varying the grain size and the nature, amount and composition of the bond. The strength of the plate may be likewise regulated by a careful choice of ingredients as well as plate dimensions. A plate of this composition has such a high degree of tensile and compressive strength that it will withstand the pressure of a high head of water. Other advantages and possibilities inherent in this structure will be apparent to one skilled in the art.

Having thus described my invention, what I claim as new and desire to secure by Letters Patent is:

An apparatus for treating liquids, such as sewage, comprising a vessel divided into an upper and lower compartment by a porous diffusion plate of granular material united by a vitrified ceramic material having the walls of its pores treated with a water repellent substance adapted to reduce the capillarity of the plate so as to permit the free passage of a fluid therethrough, said upper compartment being adapted to contain liquid, and means for passing a gaseous agent, such as air, under pressure into the lower compartment so that it may pass through the plate into the liquid confined in the upper compartment.

Signed at Worcester, Massachusetts, this 24th day of Jan. 1924.

LORENZO S. WASHBURN.